US011821601B2

(12) United States Patent
Nagliati

(10) Patent No.: US 11,821,601 B2
(45) Date of Patent: Nov. 21, 2023

(54) LIGHTING ASSEMBLY FOR A MOTOR VEHICLE AND MOTOR VEHICLE COMPRISING SAID ASSEMBLY

(71) Applicant: FERRARI S.P.A., Modena (IT)

(72) Inventor: Gian Luca Nagliati, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 18/170,588

(22) Filed: Feb. 17, 2023

(65) Prior Publication Data

US 2023/0265982 A1  Aug. 24, 2023

(30) Foreign Application Priority Data

Feb. 24, 2022  (IT) .................. 102022000003425

(51) Int. Cl.
*F21S 41/20* (2018.01)
*F21S 41/19* (2018.01)
*F21S 41/40* (2018.01)

(52) U.S. Cl.
CPC ............. *F21S 41/192* (2018.01); *F21S 41/20* (2018.01)

(58) Field of Classification Search
CPC ...... B60Q 1/05; B60Q 1/2692; B60Q 1/1438; B60Q 2300/056; B60Q 1/1446; B60Q 1/1453; B60Q 1/1492; B60Q 2400/30; F21S 41/689; F21S 41/692; F21S 41/695; F21S 41/698; F21S 41/686; F21S 41/683; F21S 41/68; F21V 11/18; F21V 11/183; F21V 11/186; F21W 2102/00; F21W 2103/55; F21W 2102/13
See application file for complete search history.

(56) References Cited

U.S. PATENT DOCUMENTS

| 2,700,725 | A | * | 1/1955 | Morphew | ............... B60Q 1/05 280/847 |
| 3,445,644 | A | | 5/1969 | Michelotti | |
| 4,755,791 | A | * | 7/1988 | Kuroda | ............... B60R 99/00 362/802 |
| 4,947,295 | A | * | 8/1990 | Carrell | ............... B60Q 1/05 362/513 |
| 7,237,936 | B1 | * | 7/2007 | Gibson | ............... F21S 45/33 362/547 |

FOREIGN PATENT DOCUMENTS

| FR | 2082777 | A5 | 12/1971 |
| JP | S5816410 | S | 11/1983 |
| JP | S6178044 | U | 5/1986 |
| JP | S62122841 | A | 6/1987 |
| JP | 6998091 | B1 | 2/2022 |

OTHER PUBLICATIONS

Italian Search Report for Application No. 102022000003425; Filing Date—Feb. 24, 2022; dated Oct. 1, 2022, 9 pages.

* cited by examiner

*Primary Examiner* — Omar Rojas Cadima
(74) *Attorney, Agent, or Firm* — CANTOR COLBURN LLP

(57) ABSTRACT

A lighting assembly for a motor vehicle is described, comprising: a first transparent surface, which is configured to transmit, in use, a low beam; and a second transparent surface, which is configured to transmit, in use, a high beam; an opaque element, which is movable between a first operating position, in which it is far from the first and second surfaces, and a second operating position, in which it obstructs at least one of the first and second surfaces.

7 Claims, 5 Drawing Sheets

LIGHTING ASSEMBLY FOR A MOTOR VEHICLE AND MOTOR VEHICLE COMPRISING SAID ASSEMBLY

CROSS-REFERENCE TO RELATED APPLICATIONS

This patent application claims the priority of Italian patent application no. 102022000003425 filed on Feb. 24, 2022, the entire disclosure of which is incorporated herein by reference.

TECHNICAL FIELD

The present invention relates to a lighting assembly for a motor vehicle and a motor vehicle comprising such a lighting assembly.

The lighting assembly is preferably a front lighting assembly of a motor vehicle.

BACKGROUND

Front lighting assemblies of a motor vehicle are known, which essentially consist of:
 a frame fixed to a body of the motor vehicle;
 a headlight arranged inside the frame; and
 a transparent element arranged so as to close the frame and connected to the frame.

The transparent element comprises, in turn:
 a first surface adapted to transmit a high beam; and
 a second surface adapted to transmit a low beam.

The design of the lighting assembly is constrained, in the known solutions, by the shapes of the first and second surfaces.

There is a need in particular in the case of high-end motor vehicles with a sporty design to overcome these constraints affecting the design of the lighting assembly in particular when the motor vehicle is parked.

Furthermore, there is a need to overcome these constraints without compromising the operational safety of the motor vehicle when being driven and taking into account the fact that the high beam is normally used in emergency conditions and that the low beam is not normally used during daytime driving.

JP-A-S62122841, FR-A-2082777, JP-A-56178044, JP-U.S. 65/816,4101, JP-B-6998091 and U.S. Pat. No. 3,445,644 describe a lighting assembly according to the preamble of claim 1 and a motor vehicle according to the preamble of claim 9.

SUMMARY

The object of the present invention is to provide a lighting assembly which allows the aforementioned need to be satisfied.

The above-mentioned object is achieved by the present invention inasmuch as it relates to a lighting assembly as defined by claim 1.

BRIEF DESCRIPTION OF THE DRAWINGS

For a better understanding of the present invention, two preferred embodiments are described in the following as non-limiting examples and with reference to the accompanying drawings, wherein.

DESCRIPTION OF EMBODIMENTS

Figure 1:
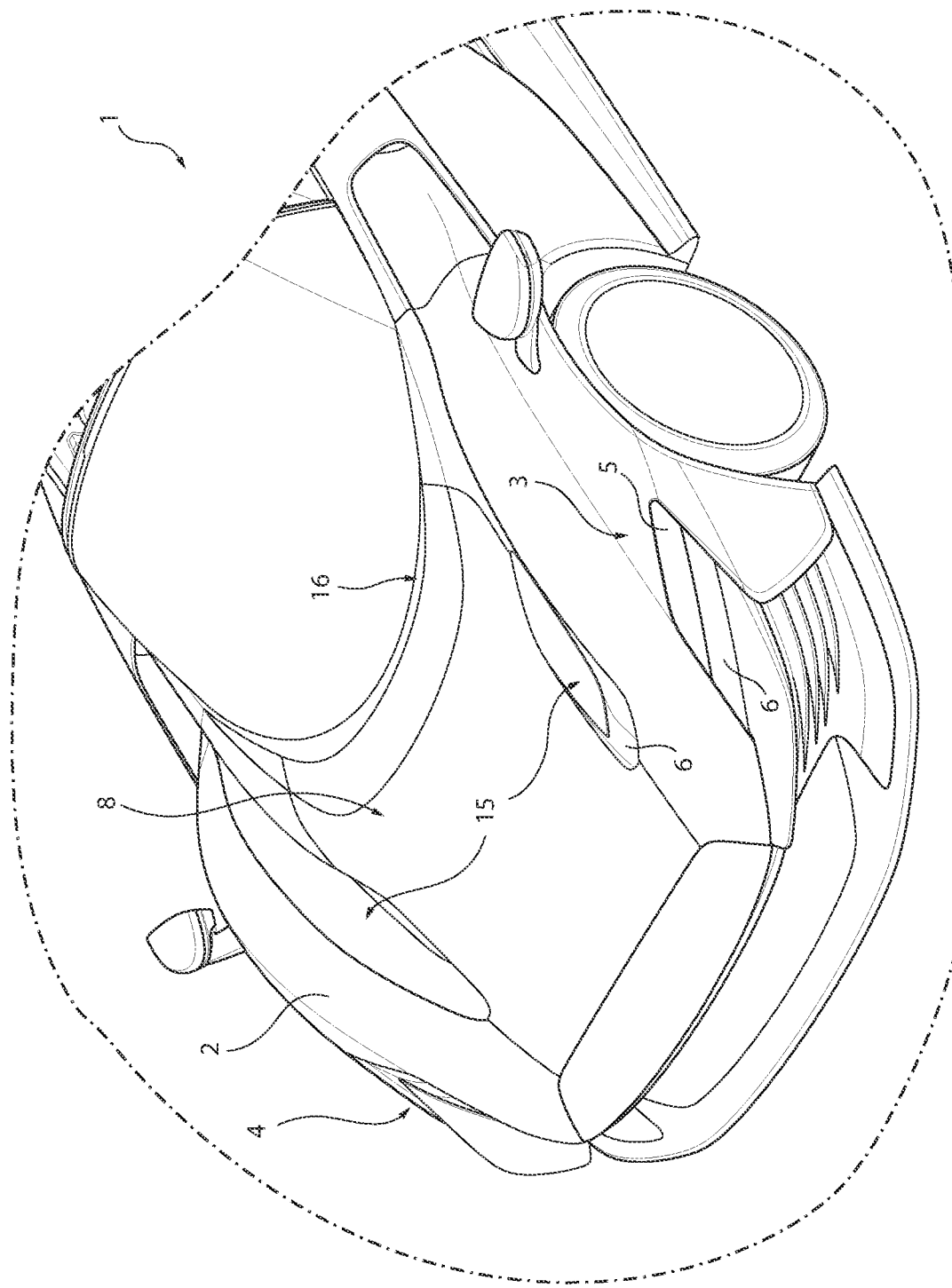
FIG. 1 is a perspective view of a motor vehicle comprising a lighting assembly provided according to the specifications of the present invention.

With reference to the accompanying figures, a motor vehicle comprising a body 2 and a pair of lighting assemblies 3, 4 is indicated by 1.

The lighting assemblies 3 are preferably arranged in a front portion 8 of the body 2.

It is noted that expressions such as "top", "bottom", "front", "rear" and the like are used in the following description with reference to conditions of normal forward movement of the motor vehicle 1.

As the lighting assemblies 3, 4 are identical to each other, only the lighting assembly 3 is described in the following.

The lighting assembly 3 essentially comprises:
 one or more light sources (not illustrated);
 a plurality of reflective surfaces; and
 a pair of transparent surfaces 5, 6 designed to transmit the light beam outside the motor vehicle 1.

More specifically, the surface 5 is configured to transmit a low beam and the surface 6 is configured to transmit a high beam.

In the illustrated case, the surface 5 is arranged above the surface 6.

Figure 10:
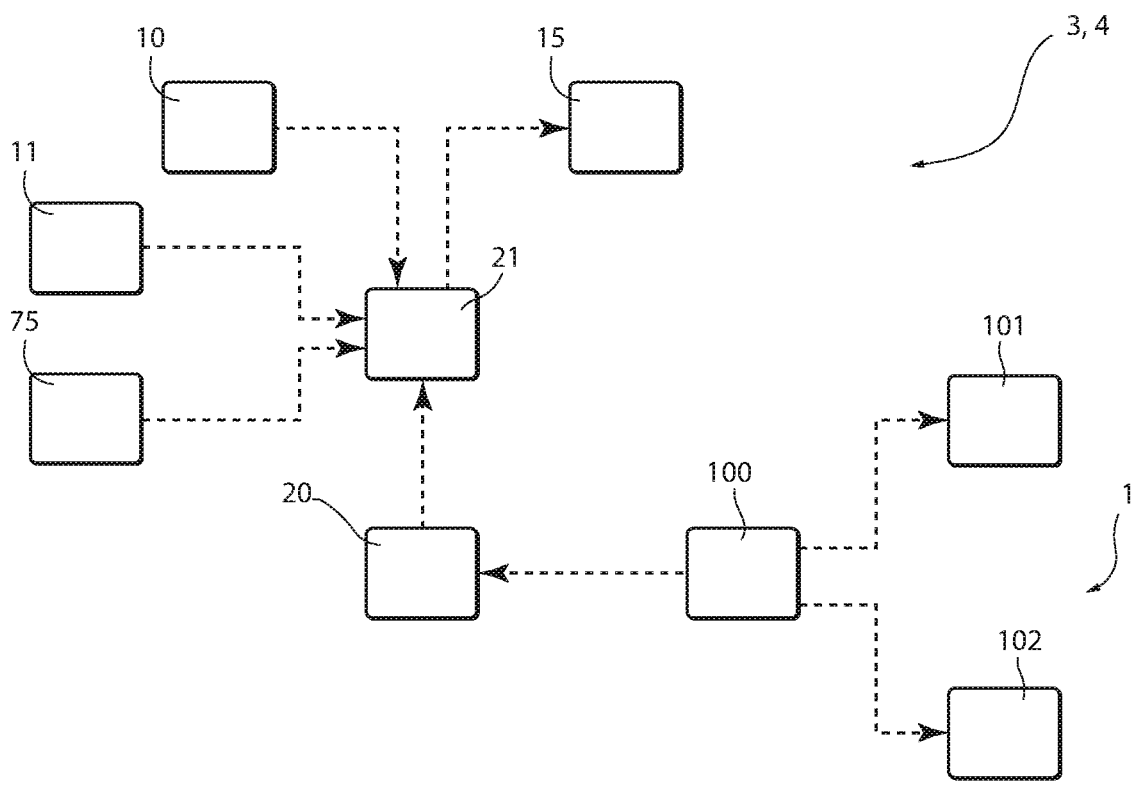
FIG. 10 is a functional diagram of further details of the motor vehicle of FIG. 1 and of the lighting assembly of FIGS. 2 to 9.

The motor vehicle 1 further comprises:
 a twilight sensor 10 (only schematically illustrated in FIG. 10) designed to generate a first signal when the level of brightness of the environment surrounding the motor vehicle 1 is below a first threshold value;
 a speedometer 11 (only schematically illustrated in FIG. 10) designed to generate a second signal associated with the speed of the motor vehicle 1;
 an operating control, which can be operated from inside the motor vehicle 1 in order to generate the low beam;
 a control panel 16 (only schematically illustrated in FIG. 1) into which a key can be inserted to control the ignition of the motor vehicle 1; and
 a sensor 75 (only schematically illustrated in FIG. 10) designed to detect the operating temperature of the lighting assembly 3, 4.

The motor vehicle 1 further comprises a plurality of sensors designed to detect a plurality of operating parameters of the lighting assembly 3.

Figure 2:
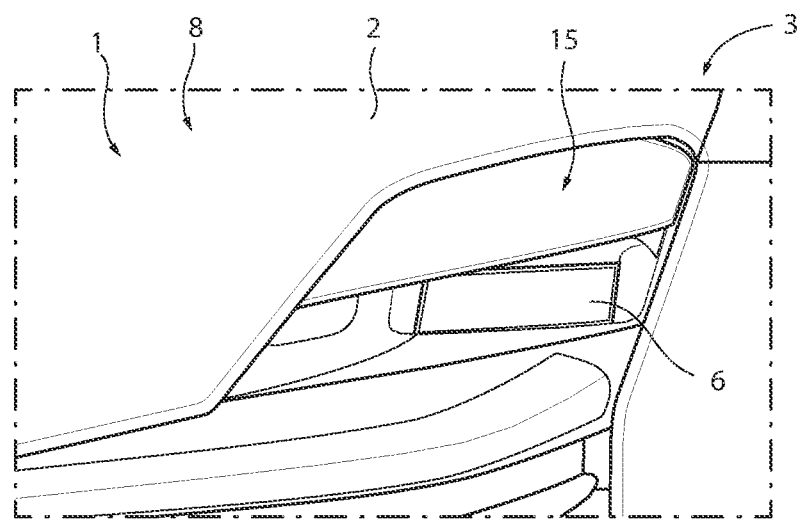
FIGS. 2 and 3 are perspective views of the lighting assembly of FIG. 1 on a significantly enlarged scale in respective operating configurations.
Figure 3:
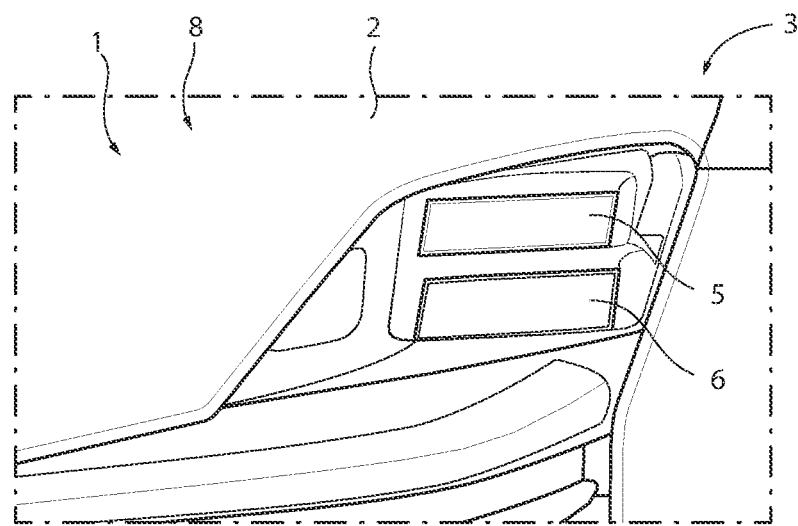

Advantageously, the lighting assembly 3 comprises an opaque element 15, which is movable between:
- a first operating position, in which it is far from the surfaces 5,6 (FIG. 3); and
- a second operating position, in which it obstructs the surface 5 (FIGS. 1 and 2).

In other words, the opaque element 15 covers the surface 5 when it is arranged in the second operating position.

The lighting assembly 3 further comprises an operating mechanism 19 in order to move the opaque element 15 between the first and second positions.

Figure 4:
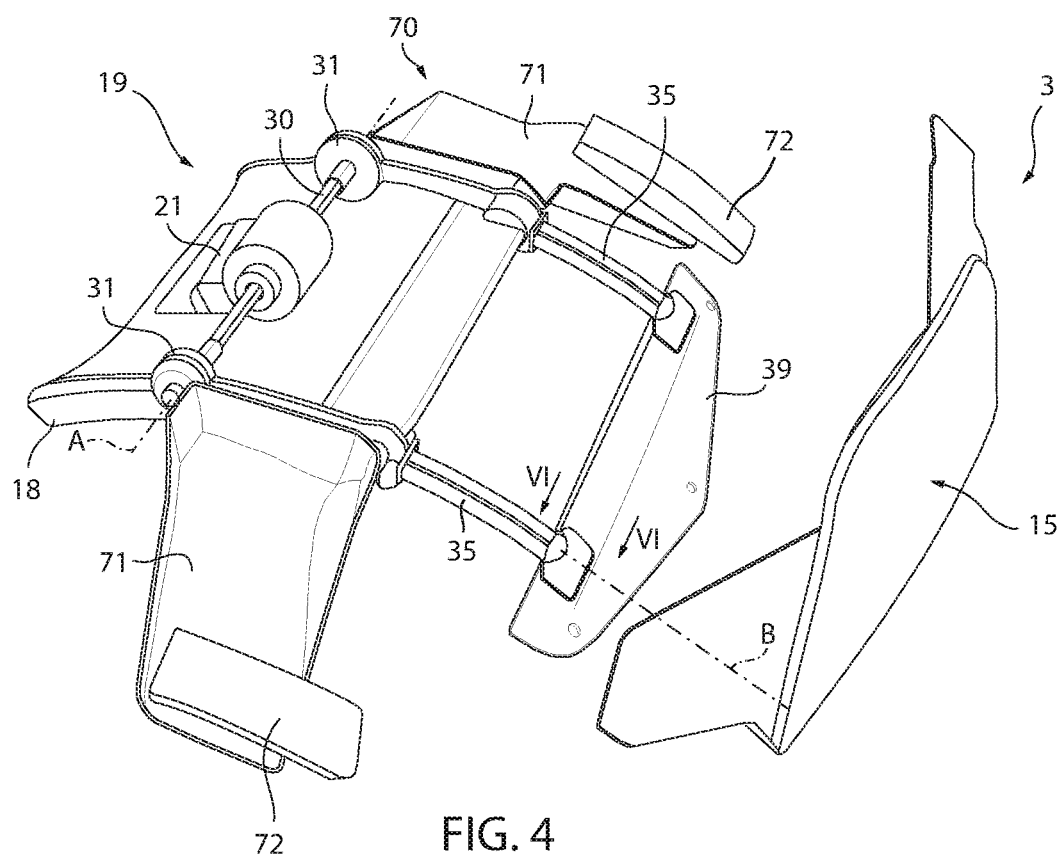
FIG. 4 is a partially exploded perspective view of first components of the lighting assembly of FIGS. 1 to 3 on a still larger scale, with parts removed for clarity.

More specifically, the operating mechanism 19 comprises (FIGS. 4 and 7 to 10):
- a frame 18 fixed to the front portion 8 of the body 2 (FIG. 4);
- a control unit 20 (only schematically illustrated in FIG. 10);
- a motor 21 controlled by the control unit 20; and
- a transmission assembly 22 interposed between the motor 21 and the opaque element 15, and designed to allow the movement of the opaque element 15 relative to the frame 18 as a result of the operation of the motor 21.

The transmission assembly 22 comprises, in turn (FIGS. 7 to 9):
- a shaft 30, which is operable by the motor 21;
- a pair of pinions 31 arranged on respective ends 33 of the shaft 30; and
- a pair of racks 35 meshing with respective pinions 31.

Figure 5:
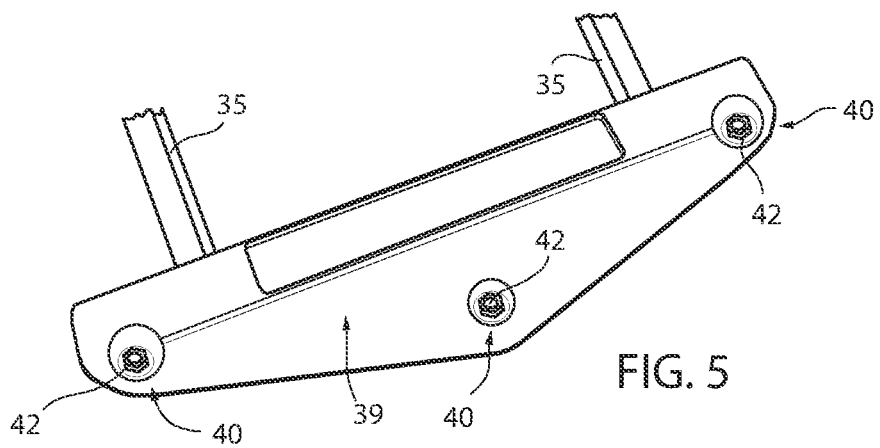
FIG. 5 is a perspective view of a few details of the first components of the lighting assembly of FIG. 4.
Figure 6:
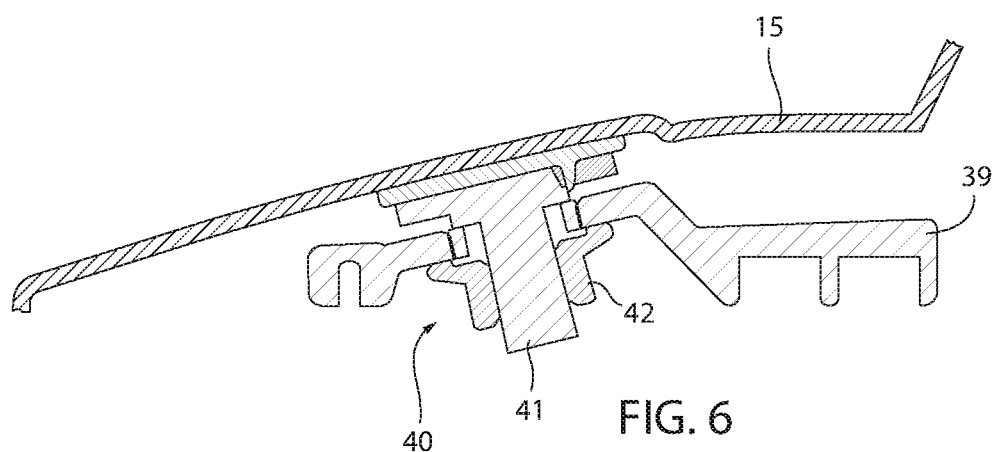
FIG. 6 is a section along line VI-VI of FIG. 4, with parts removed for clarity.
Figure 7:
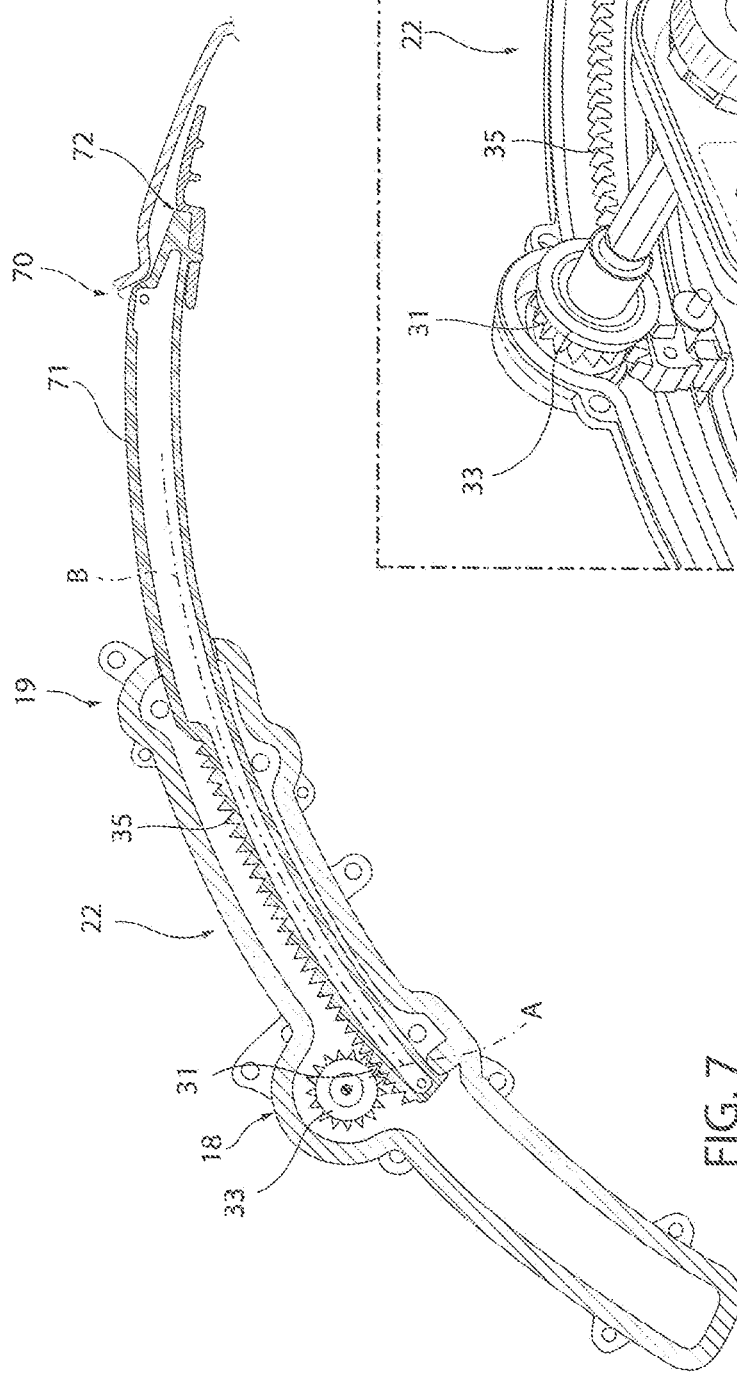
FIG. 7 illustrates further details of the lighting assembly of FIGS. 1 to 6 on an enlarged scale.

The transmission assembly 22 further comprises (FIGS. 4 to 6):
- a worm screw (not illustrated) operated by the motor 21;
- a gear (not illustrated) meshing with the worm gear and arranged on the shaft 30; and
- a mobile support 39, which is integral to the racks and to which the opaque element 15 is fixed by means of releasable connection means 40.

In the illustrated case, the shaft 30 has a hexagonal cross-section and extends along an essentially horizontal axis A in use.

The motor 21 is interposed between the pinions 31 along the axis A and arranged at the midpoint of the shaft 30.

The racks 35 have respective curved axes B, parallel to each other and orthogonal to the axis A.

The axes B are adapted so as to match the shape of the front portion 8 adjacent to the lighting assembly 3 and the shape of the surface 5 of said lighting assembly 3.

The connection means 40 comprise, in particular:
- a plurality of threaded pins 41, three in the illustrated case, glued to the opaque element 15 on the side of the support 39 and protruding in a cantilevered fashion towards said support 39; and
- a plurality of nuts 42, three in the illustrated case, fixed to the support 39, protruding in a cantilevered fashion towards the support 39 and screwed onto respective pins 41.

Figure 8:
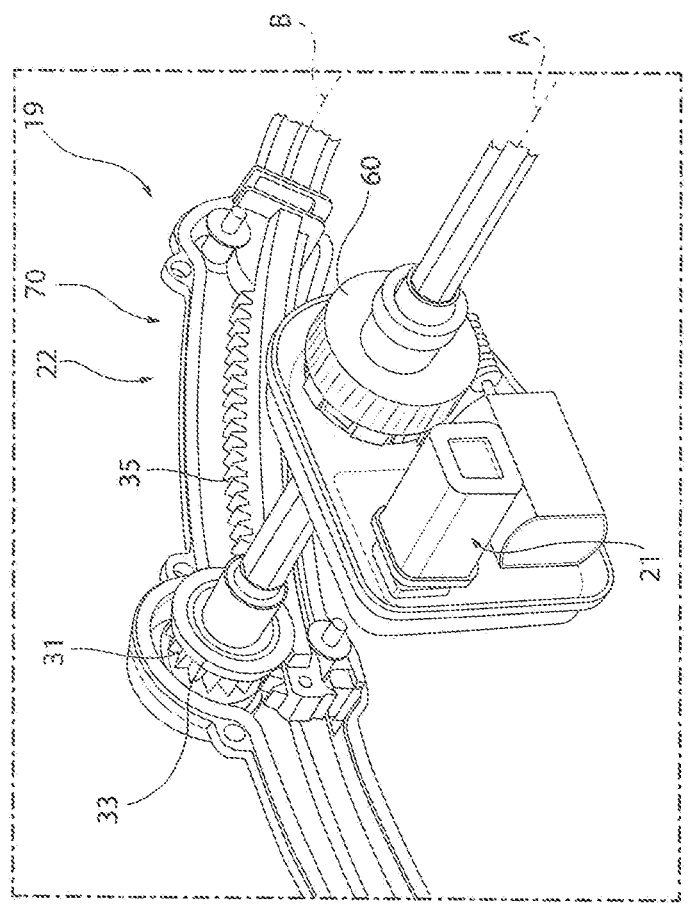
FIG. 8 illustrates the further details of FIG. 7 on a still larger scale and according to a first viewing angle.
Figure 9:
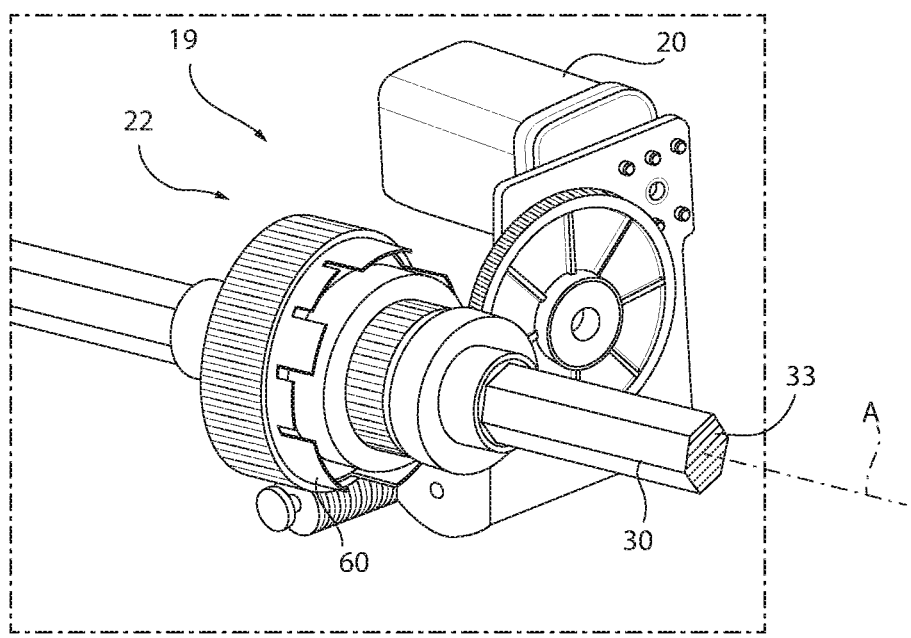
FIG. 9 illustrates the further details of FIGS. 7 and 8 in a perspective view and according to a different viewing angle.

The transmission assembly 22 further comprises a clutch 60 interposed between the motor 21 and the transmission assembly 22 (FIGS. 8 and 9).

In the illustrated case, the clutch 60 is interposed between the respective halves of the shaft 30.

The clutch 60 is dimensioned to:
- keep the motor 21 and the transmission assembly 22 operationally connected when the load applied to the opaque element 15 is below a fourth threshold value; and
- uncouple the motor 21 and the transmission assembly 22 when the applied load exceeds the fourth threshold value.

The above-mentioned fourth threshold value is higher than the aerodynamic load normally acting on the opaque element 15 and lower than the load that could injure a person inadvertently in a position along the chord of the opaque element 15 between the first and second operating positions or vice versa.

The frame 18 comprises, in turn:
- a main support body 70 for supporting the motor 21 and the transmission assembly 22; and
- a pair of side walls 71 arranged on respective sides of the main body 70 and defining respective end surfaces 72 against which the opaque element 15 strikes when it reaches the second operating position.

In the illustrated case, the surfaces 72 are made of PTFE and the opaque element 15 is made of carbon.

The control unit 20 is programmed to command the motor 21 to maintain the opaque element 15 in the second operating position.

The control unit 20 is also programmed to command the motor 21 to move the opaque element 15 from the second operating position to the first operating position when the key is inserted in the control panel 16 of the motor vehicle 1 and when at least one of the following conditions occurs:
- the twilight sensor 10 detects that the level of brightness of the environment surrounding the motor vehicle 1 is below a first threshold value; and/or
- the speedometer 11 detects that the speed of the motor vehicle 1 is above a second threshold value, e.g. 90 km/h; and/or
- the user operates the operating control for generating the low beam.

In particular, the control unit 20 is programmed to command the motor 21 to return from the first operating position to the second operating position when the speedometer 11 detects that the speed of the motor vehicle 1 is below a third threshold value, which is lower than the first threshold value, e.g. 80 km/h.

The control unit 20 is further programmed to generate:
- a first error signal when the motor 21 fails to move the opaque element 15 from the second operating position to the first operating position; and
- a second error signal when the motor 21 fails to move the opaque element 15 from the second operating position to the first operating position.

The control unit 20 is interfaced with an electronic control unit 100 (only schematically illustrated in FIG. 10) of the motor vehicle 1 so as to:
- cause the activation of a red indicator light 102 (only schematically illustrated in FIG. 10) visible inside the motor vehicle 1 in the case where the control unit 20 generates the first signal;
- cause the activation of a yellow indicator light 101 (only schematically illustrated in FIG. 10) visible inside the motor vehicle 1 in the case where the control unit 20 generates the second signal.

The control unit 20 is also programmed to identify:
- a standard operating condition when all parameters detected by the additional sensors and by the sensor 75 are within respective ranges; or
- a non-standard operating condition, when at least one of the parameters detected by the additional sensors and by the sensor 75 is outside the respective ranges.

The control unit 20 is also programmed to cause the generation of the first signal, if:

the sensor 75 detects a temperature outside the preset range and/or communication with the electronic control unit 100 of the motor vehicle 1 is interrupted; and/or the clutch 60 uncouples the motor 21 and the transmission assembly 22; and/or the control unit 20 detects a non-standard operating condition.

The operation of the lighting assembly 3 is illustrated starting with an initial condition in which the motor vehicle is stationary, for example parked. In this initial condition, the control unit 20 commands the motor 21 to maintain the opaque element 15 in the second operating position so as to cover the surface 5.

When in the second operating position, the opaque element 15 rests against the surfaces 72 of the main body 70.

As a result of the insertion of the key in the control panel 16, the control unit 20 commands the motor 21 to maintain the opaque element 15 in the second operating position.

The control unit 20 commands the motor 21 to move the opaque element 15 from the second operating position to the first operating position in which it leaves the low-beam surface 5 free, in the event that the twilight sensor 10 detects that the level of brightness of the environment surrounding the motor vehicle 1 is below the first threshold value; and/or the speedometer 11 detects that the speed of the motor vehicle 1 is above the second threshold value, e.g. 90 km/h; and/or the user operates the operating control for generating the low beam.

If the speedometer 11 detects that the speed of the motor vehicle 1 has returned below the third lower threshold value, which is lower than the first threshold value, e.g. 80 km/h, the control unit 20 commands the motor 21 to return the opaque element 15 to the second operating position.

The clutch 60 uncouples the motor 21 and the transmission assembly 22, when the applied load is greater than the fourth threshold value, so as to prevent injury to persons having happened to insert fingers or other body parts into the area of movement of the opaque element 15.

The electronic control unit 100 of the motor vehicle 1 causes the activation of the red indicator light 102 visible inside said motor vehicle 1 in the event that the motor 21 fails to move the opaque element 15 from the second operating position to the first operating position.

The electronic control unit 100 of the motor vehicle 1 causes the activation of the yellow indicator light 101 visible inside said motor vehicle 1 in the event that:

the motor 21 fails to move the opaque element 15 from the second operating position to the first operating position;

the sensor 75 detects a temperature outside the preset range and/or communication with the electronic control unit 100 of the motor vehicle 1 is interrupted; and/or the clutch 60 uncouples the motor 21 and the transmission assembly 22; and/or the control unit 20 detects a non-standard operating condition.

The operation of the lighting assembly 4 is identical and simultaneous with the lighting assembly 3 and is consequently not described in detail.

The advantages achievable by the invention are evident from an examination of the lighting assemblies 3, 4 according to the present invention.

More specifically, the opaque element 15 is movable between:

the first operating position, in which it is far from the surfaces 5, 6; and the second operating position, in which it obstructs the surface 5.

It is thereby possible to achieve a desired design of the lighting assembly 3, 4 while overcoming the constraints imposed by the shape of the surface 5 and without compromising the correct, safe operation of the motor vehicle 1.

In particular, the opaque element 15 is arranged in the second operating position when the motor vehicle 1 is parked.

The control unit 20 moves the opaque element 15 from the second operating position in which it obstructs the surface 5 to the first operating position in which it leaves the surface 5 free, in the event that the twilight sensor 10 detects that the level of brightness of the environment surrounding the motor vehicle 1 is below the first threshold value; and/or the speedometer 11 detects that the speed of the motor vehicle 1 is above the second threshold value, e.g. 90 km/h; and/or the user actuates the operating control for generating the low beam.

It is thus possible to achieve a desired aesthetic impression of the lighting assembly 3, 4 both when the motor vehicle 1 is parked and when the motor vehicle 1 is being drive, without compromising the safe operation of the motor vehicle 1 in certain operating conditions.

If the speedometer 11 detects that the speed of the motor vehicle 1 has returned below the third threshold value, which is lower than the first threshold value, e.g. 80 km/h, the opaque element 15 returns to the second operating position.

It is thus possible to return the opaque element 15 to the second operating position as soon as the operating conditions of the motor vehicle 1 permit.

The clutch 60 uncouples the motor 21 and the transmission assembly 22 when the applied load is greater than the fourth threshold value so as to prevent injury to persons having happened to insert fingers or other body parts into the area of movement of the opaque element 10.

Finally, it is clear that the lighting assembly 3,4 provided according to the present invention can be modified and varied without departing from the scope of protection defined by the claims.

The invention claimed is:

1. A motor vehicle comprising:
a body (2) defining a front portion (8) with reference to a forward moving direction of said motor vehicle (1);
a lighting assembly (3, 4) fixed to said front portion (8);
a control unit (20) programmed to control a motor member (21) fixed to a frame (18), wherein the frame (18) is fixed to the body (2) when in use;
a twilight sensor (10) designed to generate a first signal associated an environmental brightness level surrounding said motor vehicle (1);
a speedometer (11) designed to generate a second signal associated with the speed of said motor vehicle; and
an operating control, which can be operated in order to generate a low beam;
wherein said lighting assembly (3, 4) comprises a first transparent surface (5) configured to transmit, in use, the low beam; and a second transparent surface (6) configured to transmit, in use, a high beam; and an opaque element (15), which is movable between a first operating position distal to said first and second surfaces (5, 6); and a second operating position, in which the opaque element (15) at least partially obstructs one of said first and second surfaces (5, 6); and an operating mechanism (19), which is fixed to said frame (18) and operatively connected to said opaque element (15) to move said opaque element (15) between said first and second operating positions; the operating mechanism comprising an output shaft (30), which is operated by said motor member (21) and can rotate around a first axis (A); at least one rack (35), which is connected to said opaque element (15) and is movable along a path (B), which is transverse to said first axis (A), in an integral manner together with said opaque element (15); and at least one gear (31) meshing with said rack (35) and operatively connected to said output shaft (30);

wherein said control unit (20) is programmed to place said opaque element (15) in said second operating position, and wherein said control unit (20) being further programmed to cause the movement of said opaque element (15) from said second operating position to said first operating position, when at least one of said first and second signals exceeds a threshold value and/or when said operating control is activated.

2. The motor vehicle according to claim 1, wherein the control unit (20) is programmed to cause the return of said opaque element (15) from said first operating position to said second operating position, when said speedometer (11) generates, in use, a third signal below said threshold value.

3. The motor vehicle according to claim 1, further comprising an electronic control unit (100);

a first indicator (102) of an anomalous operation of said operating mechanism (19) associated with an immediate intervention request; and a second indicator (101) of an anomalous operation of said operating mechanism (19) associated with a non-immediate intervention request;

said first indicator (102) being activated, in use, in case said operating mechanism (19) cannot move said opaque element (15) from said second operating position to said first operating position;

said second indicator (101) being activated, in use:

in case said operating mechanism (19) cannot move said opaque element (15) from said first operating position to said second operating position; and/or in case the electronic control unit (100) of said motor vehicle detects, in use, that at least one operating parameter of said lighting assembly (3, 4) is not within a respective predetermined range of standard values; and/or in case a load exceeding an other threshold value is applied, in use, to said opaque element (15) during the travel of the opaque element (15) between said second operating position and said first operating position.

4. The motor vehicle according to claim 1, wherein the opaque element (15) obstructs said first surface (5) when said opaque element (15) is arranged, in use, in said second operating position;

said opaque element (15) leaving said second surface (6) free when said opaque element (15) is arranged, in use, in said second operating position.

5. The motor vehicle according to claim 1, wherein the path (B) is curved; and/or comprises a pair of gears (31) arranged on opposite sides of said output shaft (30) and meshing with respective racks (35).

6. The motor vehicle according to claim 1, wherein said frame (18) defines a pair of striking surfaces (72), against which said opaque element (15) strikes when said opaque element (15) is arranged, in use, in said second position;

said opaque element (15) being spaced apart from said striking surfaces (72), when the opaque element (15) is arranged in said first operating position and at least along a first segment of the travel from said first operating position to said second operating position.

7. The motor vehicle according to claim 1, wherein said lighting assembly (3, 4) comprises a plate (39), which is integral to said at least one rack (35) and is connected by means of releasable connection means (40) to said opaque element (15).

* * * * *